United States Patent
Peters et al.

(10) Patent No.: US 9,212,630 B2
(45) Date of Patent: Dec. 15, 2015

(54) METHODS AND SYSTEMS FOR REGENERATING AN EXHAUST GAS RECIRCULATION COOLER

(75) Inventors: Eric David Peters, Lawrence Park, PA (US); Adam Klingbeil, Niskayuna, NY (US); Michael Easter, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 686 days.

(21) Appl. No.: 13/292,409

(22) Filed: Nov. 9, 2011

(65) Prior Publication Data
US 2013/0111875 A1  May 9, 2013

(51) Int. Cl.
| | |
|---|---|
| F02M 25/06 | (2006.01) |
| F02M 25/07 | (2006.01) |
| F02D 41/00 | (2006.01) |
| F02D 41/08 | (2006.01) |

(52) U.S. Cl.
CPC ....... *F02M 25/0738* (2013.01); *F02D 41/0055* (2013.01); *F02M 25/0702* (2013.01); *F02D 41/08* (2013.01); *F02D 2200/0414* (2013.01); *F02M 25/0754* (2013.01); *F02M 25/0756* (2013.01); *Y02T 10/47* (2013.01)

(58) Field of Classification Search
CPC ....... F02D 41/029; F02D 41/08; F02D 41/16; F02D 41/405; F02D 41/0007; F02D 41/0055; F02D 41/0065; F02D 41/0087; F02D 2200/0414; F02B 37/24; F02M 25/0728; F02M 25/0732; F02M 25/0707; F02M 25/0738; F02M 25/074; F02M 25/0742; F02M 25/0744; F02M 25/0754; F02M 25/0727; F02M 25/0701; F02M 25/0796; F02M 25/0702; F02M 25/0756; F01N 9/002; F01N 13/107; Y02T 10/47
USPC .......... 60/605.2, 272–324; 701/104, 108, 102
See application file for complete search history.

(56) References Cited

U.S. PATENT DOCUMENTS

| | | | |
|---|---|---|---|
| 5,542,400 A | 8/1996 | Matsumoto et al. | |
| 6,367,256 B1 * | 4/2002 | McKee | 60/605.2 |
| 6,904,898 B1 * | 6/2005 | Sahlen | 123/568.12 |
| 7,163,005 B2 | 1/2007 | Tussing et al. | |
| 7,178,326 B2 | 2/2007 | Kojima et al. | |
| 7,198,037 B2 | 4/2007 | Sayers et al. | |
| 7,207,324 B2 | 4/2007 | Kuhnel et al. | |

(Continued)

FOREIGN PATENT DOCUMENTS

| | | |
|---|---|---|
| FR | 2880069 A1 | 6/2006 |
| FR | 2908156 A3 | 5/2008 |

OTHER PUBLICATIONS

Search Report and Written Opinion from corresponding PCT Application No. PCT/US2012/054382 dated Dec. 17, 2012.

*Primary Examiner* — Thomas Denion
*Assistant Examiner* — Kelsey Stanek
(74) *Attorney, Agent, or Firm* — GE Global Patent Operation; John A. Kramer (57) ABSTRACT

Various methods and systems are provided for regeneration of an exhaust gas recirculation cooler. One example method includes adjusting cooling of exhaust gas by an exhaust gas recirculation cooler to maintain a manifold air temperature during an idle condition of an engine. The method further includes initiating regeneration of the exhaust gas recirculation cooler during the idle condition when an effectivity of the exhaust gas recirculation cooler falls below a threshold effectivity prior to or during the idle condition.

21 Claims, 6 Drawing Sheets

(56) References Cited

U.S. PATENT DOCUMENTS

| | | |
|---|---|---|
| 7,281,529 B2 * | 10/2007 | Lew et al. ................ 123/568.12 |
| 7,284,544 B2 | 10/2007 | Hatano |
| 7,353,102 B2 | 4/2008 | Narita et al. |
| 7,451,748 B2 | 11/2008 | Nigoro et al. |
| 7,621,128 B2 | 11/2009 | Czarnowski et al. |
| 7,661,415 B2 | 2/2010 | Nakamura |
| 7,757,679 B2 | 7/2010 | Joergl et al. |
| 8,056,544 B2 * | 11/2011 | Webb et al. .............. 123/568.12 |
| 8,499,550 B2 * | 8/2013 | Perfetto et al. .................. 60/295 |
| 2003/0213230 A1 | 11/2003 | Yahata et al. |
| 2005/0021218 A1 * | 1/2005 | Bhargava et al. ............. 701/108 |
| 2009/0249782 A1 * | 10/2009 | Li et al. ............................ 60/599 |
| 2010/0051001 A1 * | 3/2010 | Webb et al. .............. 123/568.12 |
| 2011/0023839 A1 * | 2/2011 | Styles et al. .............. 123/568.12 |

* cited by examiner

METHODS AND SYSTEMS FOR REGENERATING AN EXHAUST GAS RECIRCULATION COOLER

FIELD

Embodiments of the subject matter disclosed herein relate internal combustion engines. Other embodiments relate to regenerating an exhaust gas recirculation cooler in an exhaust gas recirculation system coupled to an internal combustion engine.

BACKGROUND

Engines may utilize recirculation of exhaust gas from an engine exhaust system to an engine intake system (intake passage), a process referred to as exhaust gas recirculation (EGR), to reduce regulated emissions. Further, some EGR systems may include an EGR cooler to reduce a temperature of the recirculated exhaust gas before it enters the intake passage. In such an example, fouling of the EGR cooler may occur when particulate matter and other compounds (e.g., soot, hydrocarbons, oil, fuel, rust, ash, mineral deposits, and the like) in the exhaust gas accumulates within the EGR cooler, thereby decreasing effectiveness of the EGR cooler and increasing a pressure drop across the EGR cooler as well as temperature of the gas exiting the cooler, resulting in increased emissions and decreased fuel efficiency.

BRIEF DESCRIPTION

In one embodiment, a method includes adjusting cooling of exhaust gas by an exhaust gas recirculation cooler to maintain a manifold air temperature during an idle condition of an engine. The method further includes initiating regeneration of the EGR cooler during the idle condition when an effectivity of the EGR cooler falls below a threshold effectivity prior to or during the idle condition.

In one embodiment, the effectivity of the EGR cooler may be defined as a ratio of heat transfer. An effectivity below the threshold effectivity may indicate fouling of the EGR cooler, as the heat transfer ratio is relatively low. During the idle condition, a flow of exhaust gas through the exhaust gas recirculation cooler may be reduced, for example, thereby decreasing a temperature of the exhaust gas recirculation cooler. When a temperature of the exhaust gas recirculation cooler falls low enough, particulate matter build-up in the EGR cooler may break off such that the EGR cooler is cleaned. Further, in a configuration in which the exhaust gas recirculation cooler is bypassed, the exhaust gas is routed to an intake passage of an engine without being cooled. As such, cooling of charge air by the charge air cooler may be increased so that a mixture temperature of charge air and exhaust gas is maintained at a desired manifold air temperature, even during the EGR cooler regeneration operation. In this manner, the EGR cooler may be regenerated while an EGR amount is maintained during an idle engine operating condition, and while charge temperature is also maintained.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for regenerating an exhaust gas recirculation (EGR) cooler. In one embodiment, a method comprises adjusting cooling of exhaust gas by an EGR cooler and of charge air by a charge air cooler to maintain a manifold air temperature during an idle condition of an engine. As used herein, "maintain" includes possible deviations or fluctuations from the manifold air temperature and the method (or system) working to re-establish the manifold air temperature. The method further comprises initiating regeneration of the EGR cooler during the idle condition when an effectivity of the EGR cooler falls below a threshold effectivity prior to or during the idle condition. In some embodiments, an EGR system may include an EGR cooler bypass with an EGR cooler bypass valve (or other control element). In such a configuration, the EGR cooler may be bypassed while an amount of EGR is maintained. Due to un-cooled exhaust gas entering an intake passage of the engine, cooling of charge air by the charge air cooler may be increased such that a mixture temperature of exhaust gas and charge air is maintained at a desired manifold air temperature. As will be described herein, regeneration of the EGR cooler may be initiated not only by reducing exhaust gas flow through the EGR cooler, but also by reducing cooling fluid flow through the EGR cooler while cutting off exhaust gas flow through the EGR cooler and/or reducing a temperature of the cooling fluid via a radiator of the engine.

In one embodiment, the EGR cooler may be part of an EGR system coupled to an engine in a vehicle. A locomotive system is used to exemplify one of the types of vehicles having engines to which the cooling system may be attached. Other types of vehicles may include on-highway vehicles and off-highway vehicles other than locomotives or other rail vehicles, such as mining equipment and marine vessels. Other embodiments of the invention may be used for cooling systems that are coupled to stationary engines. The engine may be a diesel engine, or may combust another fuel or combination of fuels. Such alternative fuels may include gasoline, kerosene, biodiesel, natural gas, and ethanol. Suitable engines may use compression ignition and/or spark ignition.

Figure 1:
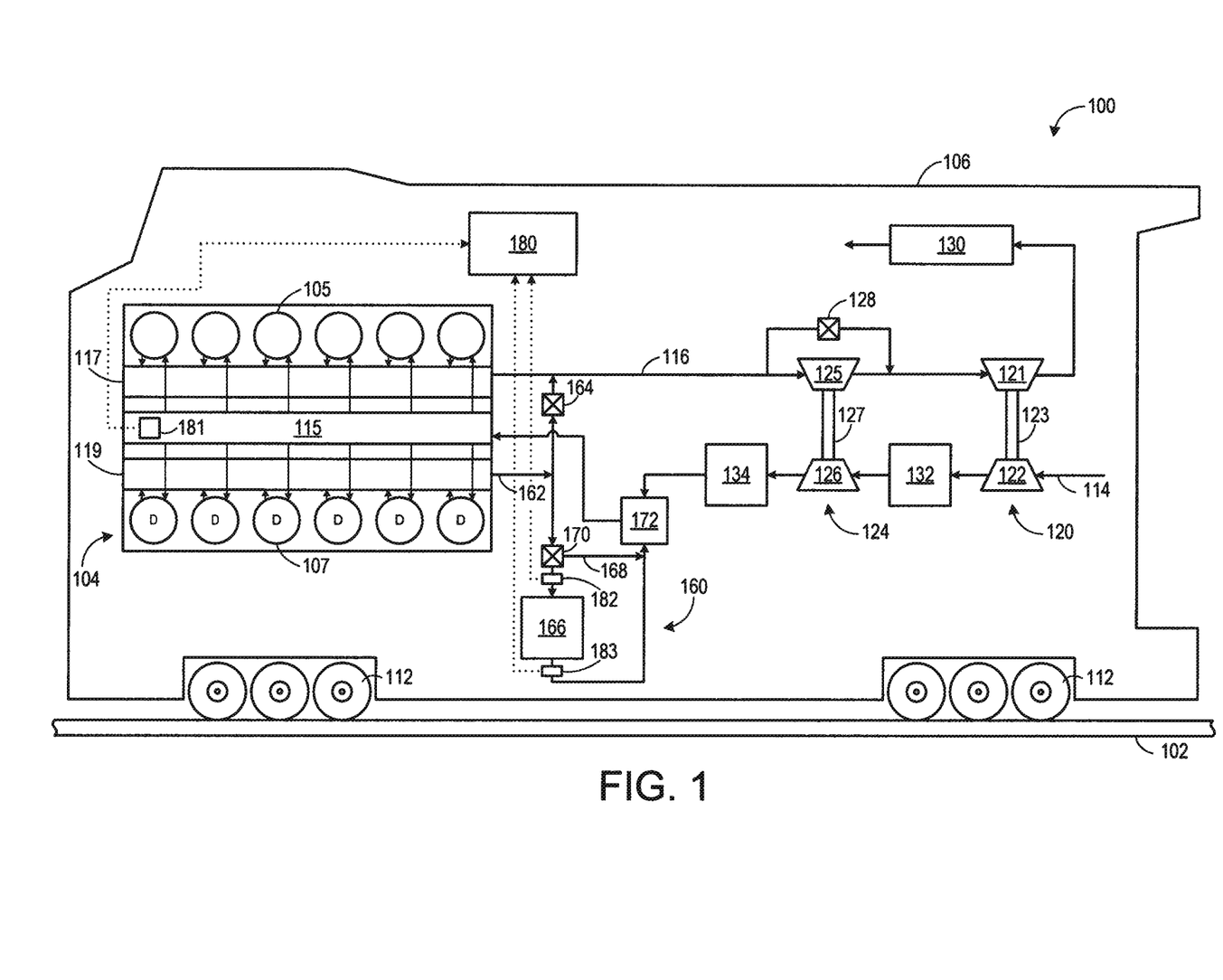
FIG. 1 shows a schematic diagram of a vehicle with an exhaust gas recirculation system including an exhaust gas recirculation cooler and an exhaust gas recirculation cooler bypass.

FIG. 1 shows a block diagram of an exemplary embodiment of a vehicle system 100, herein depicted as a locomotive or other rail vehicle 106 configured to run on a rail 102 via a plurality of wheels 112. As depicted, the rail vehicle 106 includes an engine system with an engine 104, such as an internal combustion engine.

The engine 104 receives intake air for combustion from an intake, such as an intake manifold 115. The intake may be any suitable conduit or conduits through which gases flow to enter the engine. For example, the intake may include the intake manifold 115, an intake passage 114, and the like. The intake passage 114 receives ambient air from an air filter (not shown) that filters air from outside of the rail vehicle 106. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack (not shown) of the rail vehicle 106.

In the example embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a group of non-donor cylinders 105, which includes six cylinders that supply exhaust gas exclusively to a non-donor cylinder exhaust manifold 117, and a group of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing exhaust gas to the engine 104, the amount of available oxygen for combustion is decreased, thereby reducing combustion flame temperatures and reducing the formation of nitrogen oxides (e.g., $NO_x$).

In the example embodiment shown in FIG. 1, exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. The EGR system 160 further includes an EGR cooler bypass 168 with a bypass control element 170. The EGR bypass control element 170 may be a valve such as an on/off valve controlled by a control unit 180, or it may control a variable amount of EGR, for example. The EGR bypass control element 170 may be actuated such that an amount of EGR passing through the EGR cooler 166 is reduced, and exhaust gas of a higher temperature enters the intake passage 114. In such an example, one or more charge air coolers 132 and 134 disposed in the intake passage 114 (e.g., upstream of where the recirculated exhaust gas enters) may be adjusted to increase cooling of the charge air such that a mixture temperature of charge air and exhaust gas is maintained at a desired temperature, as will be described further below. In other examples, the EGR system 160 may not include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Further, the EGR system 160 includes an EGR control element 164 disposed between the exhaust passage 116 and the EGR passage 162. The EGR control element 164 may be an on/off valve controlled by the control unit 180 (for turning the flow of EGR on or off), or it may control a variable amount of EGR, for example. In some examples, the EGR control element 164 may be actuated such that an EGR amount is reduced (exhaust gas flows from the EGR passage 162 to the exhaust passage 116). In other examples, the EGR control element 164 may be actuated such that the EGR amount is increased (e.g., exhaust gas flows from the exhaust passage 116 to the EGR passage 162). In some embodiments, the EGR system 160 may include a plurality of EGR valves or other flow control elements to control the amount of EGR.

In other embodiments, the engine may not have any cylinders designated for EGR, for example, the engine may not include donor cylinders. In such a configuration, EGR may be routed to the intake passage from a location in the exhaust passage. In some examples, the amount of EGR may be controlled by one or more EGR valves (or other flow control elements) disposed in an EGR passage between the intake passage and the exhaust passage.

As shown in FIG. 1, the vehicle system 100 further includes an EGR mixer 172 which mixes the recirculated exhaust gas with charge air such that the exhaust gas may be evenly distributed within the charge air and exhaust gas mixture. In the example embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the vehicle system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

As depicted in FIG. 1, the vehicle system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The second turbocharger 124 operates at a relatively higher pressure, and includes a second turbine 125 which drives a second compressor 126. The second turbine and the second compressor are mechanically coupled via a second shaft 127. In the example embodiment shown in FIG. 1, the second turbocharger 124 is provided with a wastegate 128 which allows exhaust gas to bypass the second turbocharger 124. The wastegate 128 may be opened, for example, to divert the exhaust gas flow away from the second turbine 125. In this manner, the rotating speed of the compressors 126, and thus the boost provided by the turbochargers 120, 124 to the engine 104 may be regulated during steady state conditions. In other embodiments, each of the turbochargers 120 and 124 may be provided with a wastegate, or only the second turbocharger 124 may be provided with a wastegate.

The vehicle system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The rail vehicle 106 further includes the control unit 180, which is provided and configured to control various components related to the vehicle system 100. In one example, the control unit 180 includes a computer control system. The control unit 180 further includes non-transitory, computer readable storage media (not shown) including code for enabling on-board monitoring and control of rail vehicle operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the rail vehicle 106. For example, the control unit 180 may receive signals from various engine sensors including, but not limited to, engine speed, engine load, boost pressure, ambient pressure, exhaust temperature, exhaust pressure, etc. Correspondingly, the control unit 180 may control the vehicle system 100 by sending commands to various components such as traction motors, alternator, cylinder valves, throttle, heat exchangers, wastegates or other valves or flow control elements, etc.

As another example, the control unit may receive signals from various temperature sensors disposed in various locations throughout the vehicle system. For example, the control unit may receive signals from a first exhaust gas temperature sensor 182 positioned upstream of the EGR cooler 166, a second exhaust gas temperature sensor 183 positioned downstream of the EGR cooler in the EGR system 160, and a manifold air temperature (MAT) sensor 181 positioned in the intake manifold 115. Based on the signals received indicating the EGR temperatures and the manifold air temperature, for example, one or both of the charge air coolers 132 and 134 may be adjusted such that a desired manifold air temperature is achieved. In other examples, the EGR cooler bypass control element 170 and/or the EGR control element 164 may be adjusted to adjust an amount of exhaust gas flowing through the EGR cooler to control the manifold air temperature.

In some embodiments, an upgrade kit that may be installed in a rail vehicle includes a non-transient computer readable medium including instructions for regenerating an EGR cooler by controlling exhaust gas flow through the EGR cooler and adjusting a charge air cooler to maintain a manifold air temperature during the regeneration. The upgrade kit may further include one or more sensors or other mechanical elements, such as temperature sensors, pressure sensors, valves, and the like. Further, the upgrade kit may further include media with human-readable instructions for installing the additional sensors, mechanical elements, and/or software upgrade.

Figure 2:
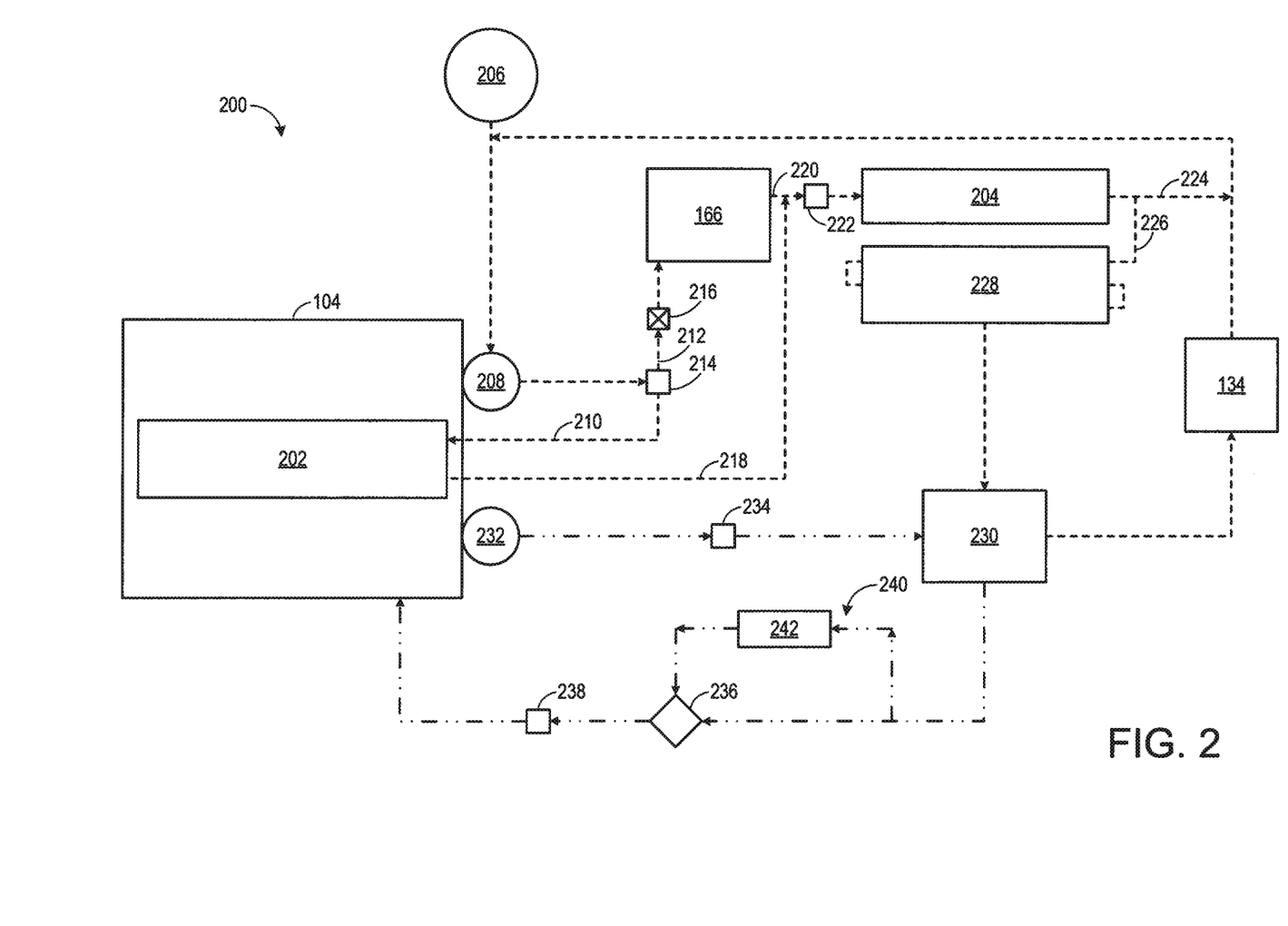
FIG. 2 shows a schematic diagram of a cooling system.

The vehicle system 100 depicted in FIG. 1 may further include a cooling system, such as the exemplary cooling system 200 shown in FIG. 2. The cooling system 200 circulates a cooling fluid (denoted by a dashed line in FIG. 2) through cylinder jackets 202 of cylinders of the engine 104 to absorb waste engine heat and distribute the heated cooling fluid to a heat exchanger, such as a radiator 204. The cooling system further circulates the cooling fluid through other heat exchangers to cool the air passing through the heat exchangers, such as the exhaust gas recirculation cooler 166 and the charge air coolers 132 and 134 (only 134 is shown in FIG. 2). As used herein, "cooling fluid" refers to a thermal transport liquid or semi-liquid material. Examples of suitable cooling fluids include water, glycols, salt solutions, alcohols, and mixtures of two or more of the foregoing. In some embodiments, more exotic materials and/or performance affecting additives are contemplated, to include corrosion resistors, defoamers, anti-sludge agents, detergents, anti-gelling agents, biocidal agents, leak preventors (such as silicates) or locators (such as dye), anti-freezing agents (such as the above mentioned glycols and alcohols), and the like.

As depicted in FIG. 2, the cooling fluid is stored in a cooling fluid reservoir 206. The cooling fluid is pumped from the cooling fluid reservoir 206 by a pump 208 to the cylinder jackets 202 of the engine 104 and to the EGR cooler 166. As shown, the cooling system 200 has a split flow loop in which a portion 210 (first portion) of the cooling fluid passes through the engine 104 and a different portion 212 (second portion) of the cooling fluid passes through the EGR cooler. As an example, 40% of the cooling fluid may flow through the EGR cooler 166 and 60% may flow through the engine 104. As another example, 35% of the cooling fluid may flow through the EGR cooler 166 and 65% of the cooling fluid may flow through the engine 104. It should be understood, the cooling fluid may be divided in any suitable proportion. A temperature of the cooling fluid is determined by an engine cooling fluid-in temperature sensor 214. Further, the cooling system 200 includes a control element 216, such as a valve or other suitable control element to control the flow of cooling fluid into the EGR cooler 166. As will be described in greater detail below with reference to FIG. 5, the control element 216 may be controlled to close during idle engine operation in order to initiate regeneration of the EGR cooler 166, for example.

Cooling fluid 218 that leaves the cylinder jackets 202 of the engine 104 combines with cooling fluid 220 that leaves the EGR cooler 166 before it enters the radiator 204. An engine cooling fluid-out temperature is determined by a temperature sensor 222. The radiator 204 may be an air-liquid heat exchanger which cools the cooling fluid flowing through the radiator 204 via airflow. As such, the radiator 204 may have a fan (not shown) which may have an adjustable speed to control the level of cooling of the radiator 204. A portion 224 of the cooling fluid exits the radiator 204 and flows back to the cooling fluid reservoir 206. The remaining portion 226 of cooling fluid flows to a sub-cooler 228 where the cooling fluid is cooled to a lower temperature than the cooling fluid cooled by the radiator 204. Like the radiator 204, the sub-cooler 228 may be an air-to-liquid heat exchanger which has an adjustable speed fan.

Cooling fluid flows from the sub-cooler 228 to an oil cooler 230 which is part of an engine oil system of the cooling system 200. The oil cooler 230 may be a liquid-to-liquid heat exchanger which cools engine oil via the cooling fluid. The cooling fluid exits the oil cooler 230 and flows to the charge air cooler 134 disposed downstream of the turbochargers 120 and 124 (shown in FIG. 1). In some embodiments, the cooling fluid may additionally or alternatively flow to the charger air cooler 132 disposed between the turbochargers 120 and 124. The charge air cooler 134 may be a liquid-to-air heat exchanger which cools the ambient engine intake air (e.g., charge air). In other examples, the charge air cooler 134 may be an air-to-air heat exchanger which includes an adjustable fan to change a rate of heat rejection. Cooling fluid exits the charge air cooler 134 and returns to the cooling fluid reservoir 206.

As mentioned above, the cooling system 200 further includes an engine oil system which circulates engine oil (denoted by a dashed and dotted line in FIG. 2) or another suitable lubricant through the engine. Engine oil, which is heated from waste heat of the engine, is pumped from the engine via a pump 232 to the oil cooler 230. An engine oil-out temperature is determined by a temperature sensor 234.

Engine oil flows from the engine oil cooler 230 to an oil filter system 236, where particulates are filtered from the engine oil before the cooled engine oil flows back to the engine. An engine oil-in temperature is determined by a temperature sensor 238. As depicted in FIG. 2, the engine oil system further includes a fixed engine oil bypass 240 with a thermostat 242. For example, the thermostat 242 may open such that engine oil may flow through the engine oil bypass 240 when an ambient temperature is greater than a threshold temperature. In this manner, engine oil flow to the engine may be increased, as the oil filter system 236 is not restricting all of the engine oil flow.

Thus, the vehicle system includes an EGR system with an EGR cooler and an EGR cooler bypass with an EGR cooler bypass control element. The bypass control element may be controlled to reduce the flow of exhaust gas through the EGR cooler. Because the exhaust gas can flow through the EGR cooler bypass, a total amount of EGR may be maintained even though exhaust gas flow through the EGR cooler is reduced. Further, the cooling system may be controlled such that a flow of cooling fluid through the EGR cooler is reduced. In this manner, a temperature of the EGR cooler may be reduced such that the EGR cooler may be regenerated, as will be described in greater detail below.

Figure 3:
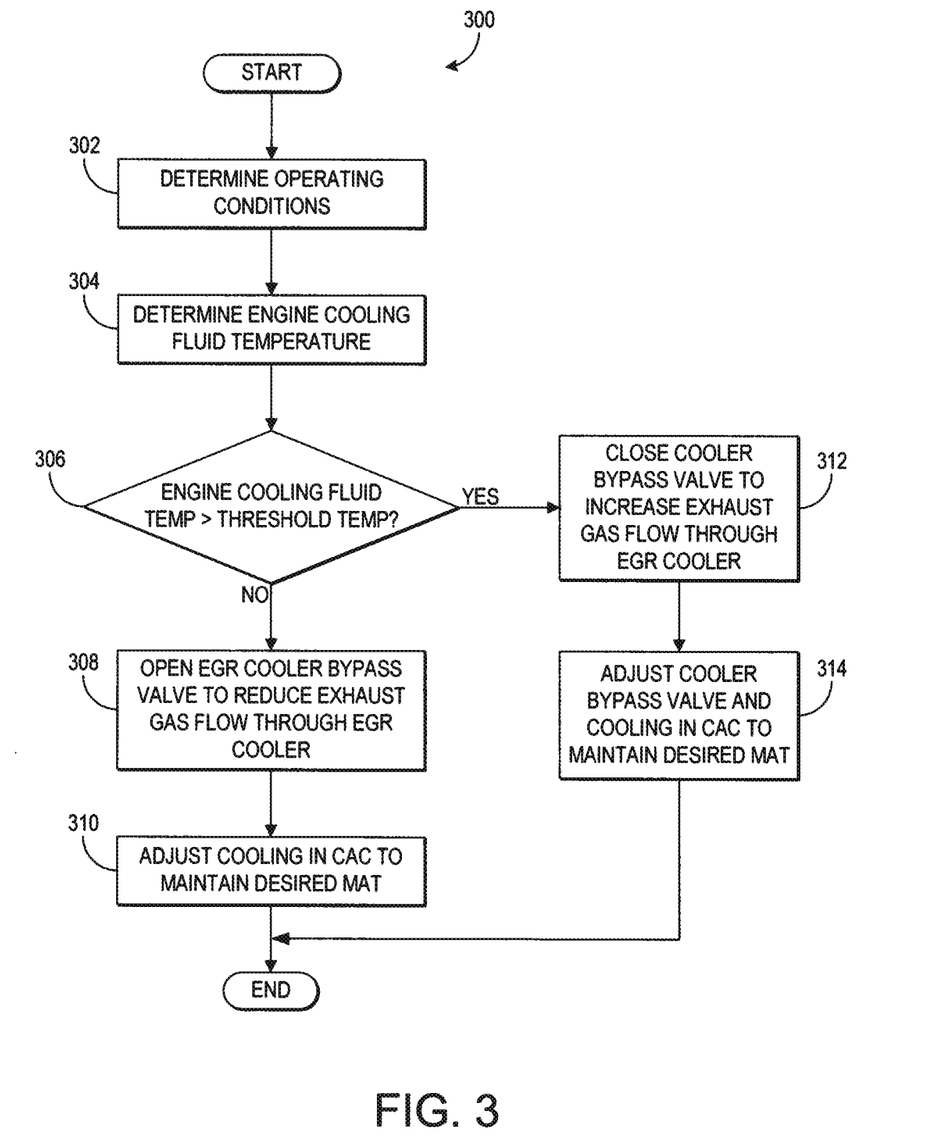
FIG. 3 shows a flow chart illustrating a method for controlling exhaust gas flow through an exhaust gas recirculation cooler during a non-idle engine operating condition.
Figure 4:
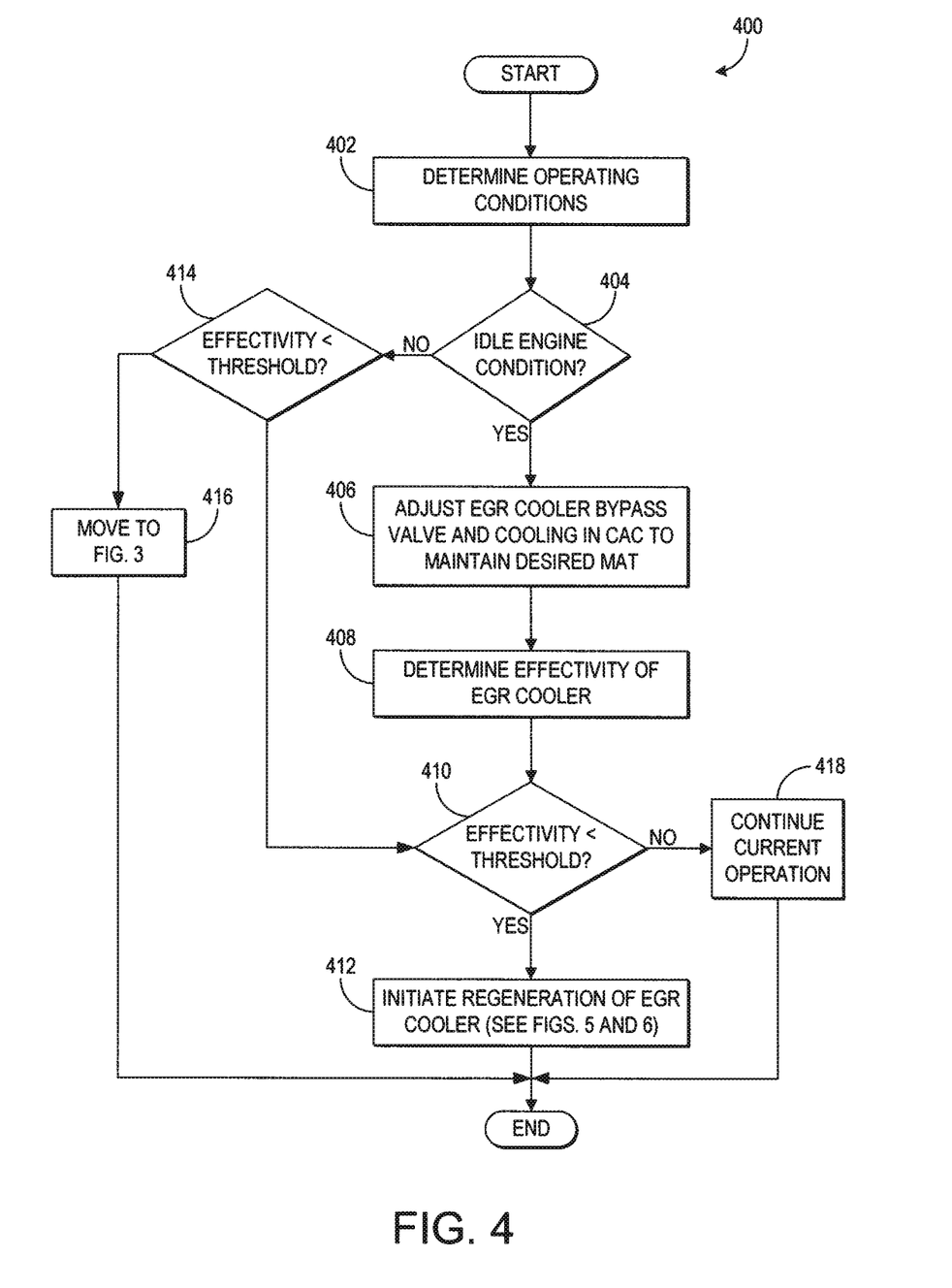
FIG. 4 shows a flow chart illustrating a method for controlling an exhaust gas recirculation cooler and a charge air cooler of a cooling system during an idle mode of engine operation.
Figure 5:
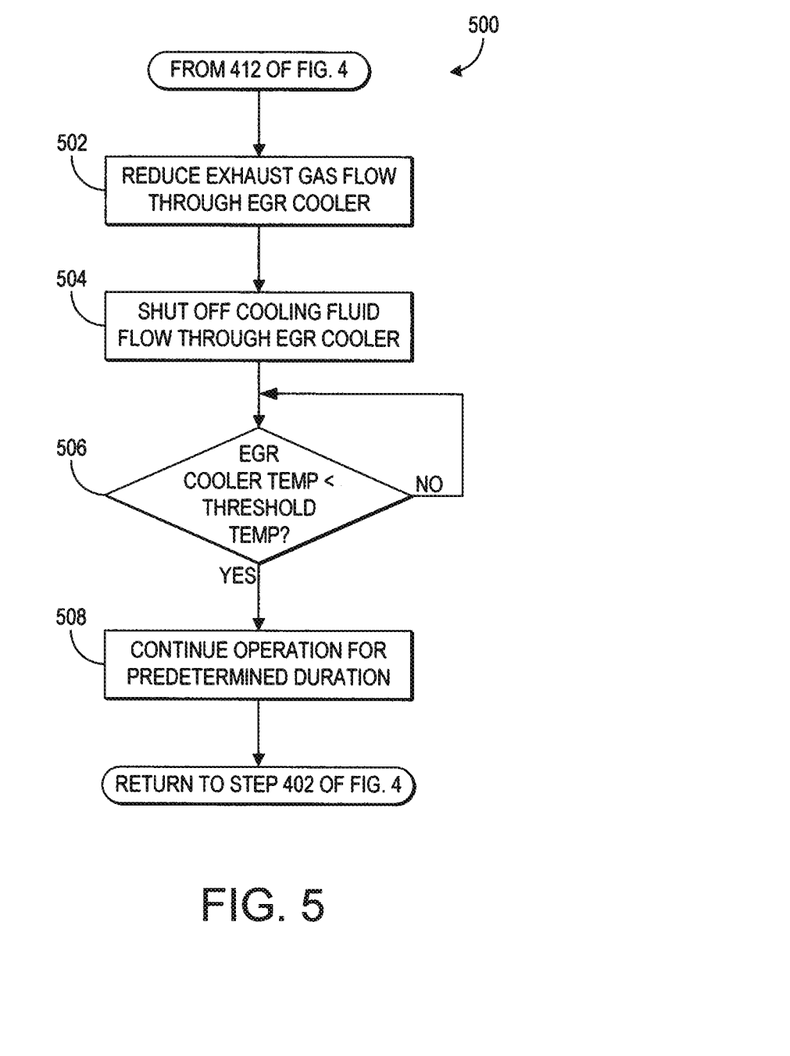
FIG. 5 shows a flow chart illustrating a method for regenerating an exhaust gas recirculation cooler during an idle engine operating condition.
Figure 6:
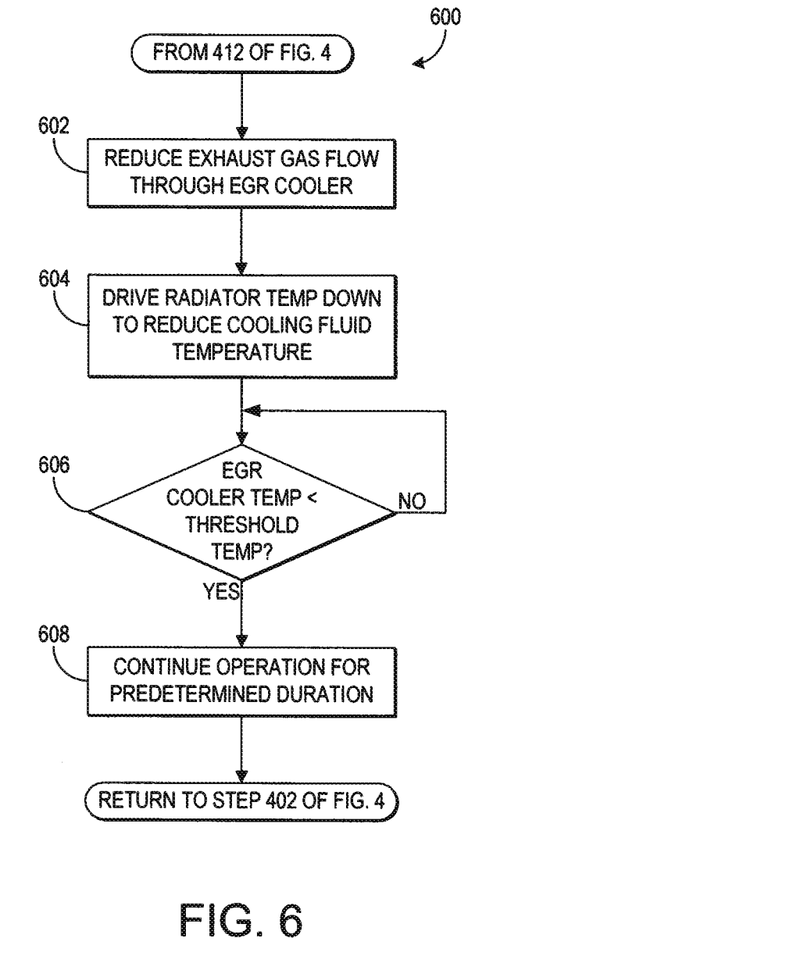
FIG. 6 shows a flow chart illustrating a method for regenerating an exhaust gas recirculation cooler during an idle engine operating condition.

FIGS. 3-6 show flow charts illustrating control methods for a vehicle system which includes an EGR system with an EGR cooler. FIG. 3 shows a method for controlling a flow of exhaust gas through the EGR cooler during a non-idle mode of operation. FIG. 4 shows a method for controlling a cooling system which includes an EGR cooler and a charge air cooler during an idle mode of engine operation. In a vehicle such as a rail vehicle, as much as 50% or more of engine operation may be idle engine operation. In one particular, non-limiting example, idle engine operation may be as long as 168 continuous hours. During this time, EGR may be desired to reduce regulated emissions, for example, and as such, may be routed through the EGR cooler. Due to a lower exhaust gas temperature and velocity during idle operation, a chance of EGR cooler fouling may be increased. Thus, during the idle mode of operation, regeneration of the EGR cooler may be initiated based on an effectivity of the EGR cooler. Methods for regenerating the EGR cooler are shown in FIGS. 5 and 6. The methods described with reference to FIGS. 3-6 may be carried out by the same control unit. For example, the methods may be carried out in sequence based on the operating conditions of the engine.

FIG. 3 shows a method 300 for controlling exhaust gas flow through an EGR cooler during a non-idle mode of engine operation in an EGR system which includes an EGR cooler bypass, such as the EGR system 160 described above with reference to FIG. 1. Specifically, the method 300 comprises determining an engine cooling fluid temperature and adjusting exhaust gas flow through the EGR cooler based on the engine cooling fluid temperature.

At step 302, engine operating conditions are determined. Engine operating conditions may include ambient temperature and/or pressure, exhaust gas temperature, engine cooling fluid temperature, engine load, engine speed, and the like.

Once the operating conditions are determined, the engine cooling fluid temperature is determined at step 304. In some examples, the engine cooling fluid temperature may be measured by an engine cooling fluid temperature sensor, for example.

At step 306, it is determined if the engine cooling fluid temperature is less than a threshold temperature. The threshold engine cooling fluid temperature may be based on engine temperature and/or heat exchange with exhaust gas. For example, if the engine temperature is relatively low and the cooling fluid temperature is relatively low, heat exchange with the exhaust gas in the EGR cooler may be reduced or suspended such that a temperature of the recirculated exhaust gas does not decrease too much. In one non-limiting example, the threshold temperature may be 140° F. (60° C.).

Thus, when the engine cooling fluid temperature is less than the threshold temperature, the method proceeds to step 308 where the EGR cooler bypass valve is opened to reduce exhaust gas flow through the EGR cooler. In some examples, the bypass valve may be fully opened to cut-off exhaust gas flow to the EGR cooler such that all of the exhaust gas flowing through the EGR system is routed through the EGR cooler bypass. In other examples, the bypass valve may be partially opened such that a portion of the exhaust gas flowing through the EGR system is routed through the EGR cooler bypass and the remaining portion continues to flow through the EGR cooler. In some embodiments, the EGR system may not include an EGR cooler bypass, but instead, may include an EGR cooler valve. In such an embodiment, the EGR cooler valve and an EGR valve may be adjusted at step 308. In this manner, exhaust gas flow through the EGR cooler may be reduced; however, exhaust gas is routed to the exhaust passage rather than the intake passage, thereby reducing an amount of EGR.

At step 310, cooling by the charge air cooler is adjusted to maintain a desired manifold air temperature. For example, because the temperature of the recirculated exhaust gas is higher, as the exhaust gas is not passing through the cooler, a mixture temperature of exhaust gas and charge air increases, thereby increasing the manifold air temperature. As such, cooling by the charge air cooler may be adjusted. The desired manifold air temperature may be based on engine operating conditions such as engine load, air fuel ratio, and the like. In one example, cooling may be increased by increasing a fan speed of the charge air cooler. In another example, cooling by the charge air cooler may be increased by increasing a fan speed of the engine radiator to increasing cooling of the cooling fluid that passes through the charge air cooler. In yet another example, cooling by the charge air cooler may be increased by adjusting a thermostat in the cooling system. It should be understood, increased cooling of charge air by the charge air cooler may be carried out in any suitable manner.

On the other hand, if it is determined that the engine cooling fluid temperature is greater than the threshold temperature, the method moves to step 312 where the EGR cooler bypass valve is closed to increase exhaust gas flow through the EGR cooler. In some examples, the EGR cooler bypass valve may be completely closed such that substantially all the exhaust gas flowing through the EGR system flows through the EGR cooler. In other examples, the EGR cooler bypass valve may be partially closed such that a portion of the exhaust gas flows through the EGR cooler bypass and the remaining portion flows through the EGR cooler. As described above, in some embodiments, the EGR system may not include an EGR cooler bypass. In such an embodiment, an EGR cooler valve and an EGR valve may be adjusted such that an exhaust gas flow through the EGR cooler is reduced and an amount of EGR is reduced.

At step 314, the EGR cooler bypass valve and/or the charge air cooler are adjusted to maintain a desired manifold air temperature. For example, when exhaust gas flow through the EGR cooler is reduced, cooling by the charge air cooler may be increased. When exhaust gas flow through the EGR cooler is increased, cooling by the charge air cooler may be reduced. As stated above, the desired manifold air temperature may be based on various engine operating parameters such as engine load, air fuel ratio, and the like.

Thus, exhaust gas flow through the EGR cooler may be adjusted based on the engine cooling fluid temperature. When the engine cooling fluid temperature is low, such as soon after an engine start, exhaust gas may be routed though the EGR cooler bypass or to the exhaust passage rather than through the EGR cooler. Once the engine cooling fluid temperature reaches the threshold temperature, exhaust gas may be routed through the EGR cooler to the intake passage of the engine.

In some embodiments, the vehicle system may have an automatic engine start stop (AESS) system. The AESS system monitors operating parameters such as ambient temperature, battery state of charge, brake system air pressure, cooling fluid temperature, and the like. Based on the monitored operating parameters, the AESS system shuts down the engine when idle engine operation is detected while keeping the rail vehicle in a ready to start state. As such, the efficiency of the vehicle system may be increased. For example, fuel is conserved and emissions are reduced during the idle operation. In some examples, however, the AESS may fail to shut down the engine. For example, the AESS may fail during conditions in which the ambient temperature is too low. As a result, control methods for reducing fouling of the EGR cooler and regenerating the EGR cooler during idle engine operation may be carried out when AESS fails to shut down the engine during idle operation, as described below with reference to FIGS. 4-6.

Various methods for controlling a cooling system to regenerate an EGR cooler are described below. In one embodiment, a method comprises adjusting cooling of exhaust gas by an exhaust gas recirculation cooler to maintain a manifold air temperature during an idle condition of an engine. The method further comprises initiating regeneration of the exhaust gas recirculation cooler during the idle condition when an effectivity of the exhaust gas recirculation cooler falls below a threshold effectivity prior to or during the idle condition.

In another embodiment, a method for an exhaust gas recirculation system comprises, during a non-idle condition, directing a first amount of exhaust gas through the exhaust gas recirculation system based on an operating parameter, and maintaining a manifold air temperature by adjusting cooling of charge air by a charge air cooler. The method further comprises, during an idle condition, adjusting a bypass control element of a bypass around an exhaust gas recirculation cooler to reduce a second amount of exhaust gas flowing through the exhaust gas recirculation cooler, and initiating regeneration of the exhaust gas recirculation cooler when an effectivity of the exhaust gas recirculation cooler falls below a threshold effectivity.

FIG. 4 shows a method 400 for controlling a cooling system which includes an EGR cooler during an idle mode of engine operation. Specifically, the method determines if the engine is under idle operation and adjusts an EGR bypass valve (or other control element) to control the flow of exhaust gas through the EGR cooler and adjusts cooling in a charge air cooler such that a desired manifold air temperature is maintained.

At step 402, operating conditions are determined. The operating conditions may include engine speed, engine load, exhaust gas temperature, and the like.

Once the operating conditions are determined, it is determined if the engine is under an idle operating condition at step 404. It may be determined that the engine is under an idle operating condition if the engine speed is less than a threshold speed or the engine load is less than a threshold load, for example.

If it is determined that the engine is under an idle operating condition, the method continues to step 406 where the EGR cooler bypass valve and cooling of charge air by the charge air cooler ("CAC") are adjusted to maintain a desired manifold air temperature. For example, the desired manifold air temperature may be based on engine speed, engine load, and/or air fuel ratio. The desired manifold air temperature may be higher or lower during idle operating conditions than during non-idle operating conditions. As such, in one example, the EGR cooler bypass valve may be adjusted such that exhaust gas flow through the EGR cooler is reduced to increase a temperature of recirculated exhaust gas. In another example, the EGR cooler bypass valve may be adjusted to increase exhaust gas flow through the EGR cooler and reduce a temperature of the recirculated exhaust gas. A fan speed of the charge air cooler may be increased to further reduce a temperature of the recirculated exhaust gas/charge air mixture when a reduced manifold air temperature is desired.

At step 408, an effectivity of the EGR cooler is determined. For example, the effectivity of the EGR cooler is a ratio of heat transfer which may be calculated using temperature values of three of the following: exhaust gas in ($T_{gas\ in}$), exhaust gas out ($T_{gas\ out}$), cooling fluid in ($T_{cooling\ fluid\ in}$), and cooling fluid out ($T_{cooling\ fluid\ out}$), according to a formula such as the following:

$$\varepsilon = \frac{T_{gasin} - T_{gasout}}{T_{gasin} - T_{coolingfluidout}},$$

or a variation thereof. Thus, two or more sensors disposed at an inlet and outlet of the EGR cooler in the EGR passage may measure the exhaust gas temperatures of exhaust gas flowing into and out of the EGR cooler and cooling fluid temperatures of cooling fluid flowing into and out of the EGR cooler.

Once the effectivity is determined, it is determined if the effectivity is less than a threshold effectivity at step 410. The threshold effectivity may be based on the efficiency of the EGR cooler at a given effectivity. For example, as the effectivity of the EGR cooler decreases, the efficiency of the EGR cooler decreases. As one non-limiting example, the threshold effectivity may be between 85 and 95 percent (%), and more specifically, 90%. An EGR cooler that is fouled due to build-up of particulates from the exhaust gas may have a low effectivity, for example, as exhaust gas may be not effectively cooled. Thus, at step 412, regeneration of the EGR cooler is initiated to clean the EGR cooler when an effectivity of the EGR cooler is less than the threshold effectivity. Regeneration may be carried out by not only reducing exhaust gas flow through the cooler, but by reducing cooling fluid flow through the cooler, as described below with reference to FIG. 5, or reducing the temperature of the cooling fluid flowing through the cooler, as described below with reference to FIG. 6, or by reducing exhaust gas flow through the cooler, reducing cooling fluid flow through the cooler, and reducing the temperature of the cooling fluid flowing through the cooler, concurrently.

If, on the other hand, the effectivity is greater than the threshold effectivity, the method moves to 418 and current operation of the cooling system continues.

Returning to step 404, if it is determined that engine is not under an idle operating condition, the method moves to step 414 where it is determined if the effectivity is less than a threshold effectivity. If it is determined that the effectivity is less than the threshold effectivity, the method moves to step 410 described above. In some examples, the threshold effectivity during the non-idle condition may be the same threshold effectivity as during the idle condition. In other examples, the threshold effectivity during the non-idle condition may be less than or greater than the threshold effectivity during the idle condition. On the other hand, if it is determined that the effectivity is greater than the threshold effectivity, the method continues to 416 where the method returns to method 300 of FIG. 3 in which exhaust gas flow through the EGR cooler is controlled based on the engine cooling fluid temperature.

In this manner, the flow of exhaust gas through the EGR cooler may be reduced during an idle engine operating condition. Because fouling of the EGR cooler may increase during idle operation due to low cooling fluid temperature and thermophoresis, low exhaust gas temperature, high oil carry over, and the like, reducing the exhaust gas flow through the cooler may reduce fouling of the EGR cooler. When exhaust gas flow through the EGR cooler is reduced via an EGR cooler bypass, a total amount of EGR may still be maintained. Since more of the exhaust gas flows around the EGR cooler instead of through the EGR cooler, the recirculated exhaust gas has a higher temperature. As such, cooling of charge air by the charge air cooler may be increased such that the manifold air temperature is maintained.

FIG. 5 shows a method 500 for regenerating an EGR cooler in a cooling system with a split cooling fluid loop in which different portions of cooling fluid flow through the EGR cooler and the engine, such as described with reference to FIG. 2 above. Specifically, the method reduces flow through the EGR cooler and shuts off cooling fluid flow to the EGR cooler. As such, a temperature of the cooler may be significantly reduced such that particulate matter that has built-up inside the EGR cooler may solidify and break off from the EGR cooler.

Continuing from step 412 of method 400, at step 502, exhaust gas flow through the EGR cooler is reduced. For example, the EGR cooler bypass valve may be adjusted to reduce some or all exhaust gas flow through the EGR cooler, while maintaining a desired amount of EGR. In embodiments in which the EGR system does not have an EGR cooler bypass, the EGR cooler valve and EGR valve may be adjusted such that exhaust gas flow through the EGR cooler is at least partially reduced. In such an embodiment, however, when exhaust gas flow through the EGR cooler is reduced, the amount of EGR is reduced.

Once the exhaust gas flow through the EGR cooler is reduced, the method proceeds to step 504 where the cooling fluid flow through the EGR cooler is shut off. As an example, the cooling system may include a valve which may be actuated to reduce some or all cooling fluid flow through the EGR cooler. By reducing exhaust gas flow and cooling fluid flow through the EGR cooler, a temperature of the EGR cooler may decrease to an ambient temperature at which EGR cooler regeneration may occur. Thus, at step 506, it is determined if the EGR cooler temperature (e.g., a core temperature of the EGR cooler) is less than a threshold temperature. The threshold temperature may be a temperature at which particulate matter, such as soot, that has accumulated in the EGR cooler may cool down and break off. As one non-limiting example, the threshold temperature may be between 40° C. and 50° C.

If it is determined that the EGR cooler temperature is greater than the threshold temperature, the method returns to step 506 and waits for the EGR cooler temperature to reach the threshold temperature. On the other hand, if it is determined that the EGR cooler temperature is less than the threshold temperature, the method continues to step 508 and operation (e.g., reduced flow exhaust gas flow and cooling fluid flow through the EGR cooler) is continued for a predetermined continuous duration. As a non-limiting example, the predetermined continuous duration may be 4 to 5 hours (e.g., operation is continued for 4 to 5 hours at a time). As a more specific example, the predetermined continuous duration may be 1 to 2 hours (e.g., operation is continued for 1 to 2 hours at a time). During the regeneration of the EGR cooler, cooling of charge air by the charge air cooler may be adjusted. For example, when the exhaust gas flow bypasses the EGR cooler, the exhaust gas entering the intake passage may be relatively hot. As such, a fan speed of the charge air cooler may be increased such that the exhaust gas/charge air mixture maintains a desired manifold air temperature.

Once the predetermined duration has passed, the method returns to step 402 of method 400 in which an idle mode of the cooling system is carried out, as described above with reference to FIG. 4.

Thus, cooling fluid flow through the EGR cooler may be reduced while exhaust gas flow through the EGR cooler is reduced to initiate regeneration of the EGR cooler. By reducing cooling fluid flow through the EGR cooler, a core temperature of the EGR cooler may decrease such that accumulated particulate matter may break off of the EGR cooler, thereby cleaning the EGR cooler.

FIG. 6 shows a method 600 for regenerating an EGR cooler in a cooling system. Specifically, the method reduces an exhaust gas flow through the EGR cooler and reduces the temperature of the cooling fluid which flows through the EGR cooler. In this manner, the temperature of the EGR cooler may be reduced such that regeneration of the EGR cooler may occur to clean accumulated particulate matter from the EGR cooler.

Continuing from step 412 of method 400, at step 602, exhaust gas flow through the EGR cooler is reduced. For example, as described above, the EGR cooler bypass valve may be adjusted to reduce some or all exhaust gas flow through the EGR cooler, while maintaining a desired amount of EGR. In embodiments in which the EGR system does not have an EGR cooler bypass, the EGR cooler valve and EGR valve may be adjusted such that exhaust gas flow through the EGR cooler is at least partially reduced. In such an embodiment, however, when exhaust gas flow through the EGR cooler is reduced, the amount of EGR is reduced.

Once the exhaust gas flow through the EGR cooler is reduced, the method proceeds to step 604 where a temperature of the radiator is driven down to reduce a temperature of the cooling fluid which flows through the EGR cooler. In one example, a speed of the radiator fan may be increased in order to increase cooling of the cooling fluid by the radiator. In another example, a speed of the cooling fluid through the radiator may be increased in order to increase cooling of the cooling fluid by the radiator. By reducing the temperature of the cooling fluid which flows through the EGR cooler, a temperature of the EGR cooler (e.g., a core temperature of the EGR cooler) may reduce to temperature at which regeneration may occur. Thus, at step 606, it is determined if the EGR cooler temperature is less than a threshold temperature. The threshold temperature may be a temperature at which particulate matter, such as soot, that has accumulated in the EGR cooler may cool down and break-off. As one non-limiting example, the threshold temperature may be between 40° C. and 50° C.

If it is determined that the EGR cooler temperature is greater than the threshold temperature, the method returns to step 606 and waits for the EGR cooler temperature to reach the threshold temperature. On the other hand, if it is determined that the EGR cooler temperature is less than the threshold temperature, the method proceeds to step 608 and operation (e.g., reduced flow exhaust gas flow and decreased EGR cooler cooling fluid temperature) is continued for a predetermined duration. As a non-limiting example, the predetermined duration may be 4 to 5 hours. As a more specific example, the predetermined duration may be 1 to 2 hours. During the regeneration of the EGR cooler, cooling of charge air by the charge air cooler may be adjusted, as described above. For example, when the exhaust gas flow bypasses the EGR cooler, the exhaust gas entering the intake passage may be relatively hot. As such, a fan speed of the charge air cooler may be increased such that the exhaust gas/charge air mixture maintains a desired manifold air temperature. In some examples, increasing the fan speed of the charge air cooler may not be necessary, as cooling fluid from the radiator is already at a lower temperature for regeneration of the EGR cooler.

Once the predetermined duration has passed, the method returns to step 402 of method 400 in which an idle mode of the cooling system is carried out, as described above with reference to FIG. 4.

Thus, regeneration of the EGR cooler may be initiated by increasing cooling of the cooling fluid while exhaust gas flow through the EGR cooler is reduced. By reducing the temperature of the cooling fluid, the core temperature of the EGR cooler may be reduced such that accumulated particulate matter may break off, thereby cleaning the EGR cooler.

Although various embodiments have been described herein in regards to adjusting cooling of exhaust gas by an EGR cooler to maintain a manifold air temperature during an idle condition of an engine, and initiating regeneration of the EGR cooler under certain operating conditions, other embodiments relate to EGR cooler bypass control more generally. For example, in one embodiment, a method of engine system control comprises, during an idle condition of an engine of the engine system, actuating one or more bypass control elements of an EGR cooler bypass to completely bypass the EGR cooler. That is, all EGR routed through a passageway to the EGR cooler is bypassed around the EGR cooler, with none of the EGR passing through the cooler. In another embodiment, a method of engine system control comprises starting the engine, and if a measured temperature (e.g., external ambient temperature, temperature in the intake manifold, engine oil reservoir temperature, other internal temperature associated with the engine) is less than a threshold temperature that is indicative of a cold start of the engine, routing all EGR around an EGR cooler. That is, all EGR passing through a passageway to the EGR cooler is bypassed around the cooler, with none of the EGR passing through the cooler. Bypass may be effectuated by actuating one or more bypass control elements of an EGR cooler bypass to completely bypass the EGR cooler. In either embodiment, there are at least two possible modes of operation: (i) EGR is routed from the engine exhaust (e.g., exhaust of donor cylinders) to and through an EGR cooler for cooling; or (ii) during idle or cold startup, EGR is routed from the engine exhaust, and instead of passing through the EGR cooler, all the EGR is bypassed around the EGR cooler, for providing to the engine air intake.

As used herein, the term "between," when referring to a range of values defined by two endpoints, such as between value "X" and value "Y," means that the range includes the stated endpoints.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
adjusting cooling of exhaust gas by an exhaust gas recirculation cooler to maintain a manifold air temperature during an idle condition of an engine; and
initiating regeneration of the exhaust gas recirculation cooler during the idle condition responsive to an effectivity of the exhaust gas recirculation cooler falling below a threshold effectivity prior to or during the idle condition, the regeneration including reducing a temperature of the exhaust gas recirculation cooler to at least a threshold temperature by reducing exhaust gas flow through the exhaust gas recirculation cooler, the threshold temperature comprising a temperature at which particulate matter accumulated in the exhaust gas recirculation cooler cools down and breaks off.

2. The method of claim 1, further comprising adjusting a bypass control element of a bypass around the exhaust gas recirculation cooler to reduce exhaust gas flow through the exhaust gas recirculation cooler during the idle condition.

3. The method of claim 1, further comprising fully opening a bypass control element of a bypass around the exhaust gas recirculation cooler responsive to the effectivity of the exhaust gas recirculation cooler falling below the threshold effectivity to reduce exhaust gas flow through the exhaust gas recirculation cooler to initiate the regeneration of the exhaust gas recirculation cooler.

4. The method of claim 3, further comprising reducing flow of a cooling fluid through the exhaust gas recirculation cooler to initiate the regeneration of the exhaust gas recirculation cooler.

5. The method of claim 3, further comprising reducing a temperature of a cooling fluid flowing through the exhaust gas recirculation cooler responsive to the effectivity of the exhaust gas recirculation cooler falling below the threshold effectivity to initiate the regeneration of the exhaust gas recirculation cooler.

6. The method of claim 1, further comprising carrying out the regeneration of the exhaust gas recirculation cooler for a continuous duration of one to two hours.

7. The method of claim 1, further comprising adjusting an exhaust gas recirculation control element to reduce an amount of exhaust gas recirculation during the idle condition.

8. The method of claim 1, wherein the effectivity comprises a ratio of heat transfer of the exhaust gas recirculation cooler, wherein the threshold effectivity is between 85 and 95 percent, and wherein adjusting cooling of exhaust gas by the exhaust gas recirculation cooler to maintain the manifold air temperature during the idle condition of an engine comprises, when the effectivity of the exhaust gas recirculation cooler is above the threshold during the idle condition, adjusting a bypass control element of a bypass around the exhaust gas recirculation cooler to increase exhaust gas flow through the exhaust gas recirculation cooler.

9. The method of claim 1, further comprising, during a non-idle condition, directing exhaust gas flow through the exhaust gas recirculation cooler when a temperature of engine cooling fluid is greater than a threshold temperature.

10. The method of claim 1, further comprising adjusting cooling of charge air by a charge air cooler to maintain the manifold air temperature during the idle condition.

11. A method for an exhaust gas recirculation system, comprising:
    during a non-idle condition:
        directing a first amount of exhaust gas through the exhaust gas recirculation system based on an operating parameter; and
        maintaining a manifold air temperature by adjusting cooling of charge air by a charge air cooler; and
    during an idle condition:
        adjusting a bypass control element of a bypass around an exhaust gas recirculation cooler to reduce a second amount of exhaust gas flowing through the exhaust gas recirculation cooler;
        adjusting cooling of the charge air by the charge air cooler to maintain the manifold air temperature responsive to the reduced second amount of exhaust gas flowing through the exhaust gas recirculation cooler;
        determine an effectivity of the exhaust gas recirculation cooler, the effectivity comprising a ratio of heat transfer of the exhaust gas recirculation cooler; and
        initiating regeneration of the exhaust gas recirculation cooler when the effectivity of the exhaust gas recirculation cooler falls below a threshold effectivity.

12. The method of claim 11, further comprising adjusting a fan rate of the charge air cooler to adjust the cooling of the charge air cooler.

13. The method of claim 11, further comprising opening the bypass control element to reduce exhaust gas flow through the exhaust gas recirculation cooler to reduce a temperature of the exhaust gas recirculation cooler and initiate the regeneration of the exhaust gas recirculation cooler.

14. The method of claim 13, further comprising reducing a cooling fluid flow through the exhaust gas recirculation cooler while cutting-off exhaust gas flow through the exhaust gas recirculation cooler to reduce the temperature of the exhaust gas recirculation cooler.

15. The method of claim 13, further comprising increasing fan speed of an engine radiator fluidically coupled to the exhaust gas recirculation cooler via a cooling fluid system to reduce the temperature of the exhaust gas recirculation cooler.

16. The method of claim 11, further comprising adjusting cooling of the charge air by the charge air cooler to maintain the manifold air temperature during regeneration of the exhaust gas recirculation cooler.

17. The method of claim 11, further comprising initiating regeneration of the exhaust gas recirculation cooler during a subsequent idle condition when the effectivity of the exhaust gas recirculation cooler falls below the threshold effectivity during the non-idle condition.

18. A system for an engine, comprising:
    a charge air cooler disposed in an intake passage of the engine;
    an exhaust gas recirculation system including an exhaust gas recirculation cooler and an exhaust gas recirculation cooler bypass with an exhaust gas recirculation cooler bypass control element; and
    a control unit configured to identify an idle condition of the engine and determine an effectivity of the exhaust gas recirculation cooler based on a ratio of exhaust gas to coolant heat transfer in the exhaust gas recirculation cooler, to adjust the exhaust gas recirculation cooler bypass control element to reduce a first amount of exhaust gas flowing through the exhaust gas recirculation cooler responsive to the idle condition, to initiate regeneration of the exhaust gas recirculation cooler by reducing a temperature of the exhaust gas recirculation cooler during the idle condition responsive to the determined effectivity falling below a threshold effectivity prior to or during the idle condition, and to adjust cooling of charge air by the charge air cooler during the idle condition and during regeneration of the exhaust gas recirculation cooler.

19. The system of claim 18, wherein the control unit is further configured to increase cooling of the charge air by the charge air cooler when a second amount of exhaust gas bypassing the exhaust gas recirculation cooler increases.

20. The system of claim 18, further comprising a radiator in fluid communication with the exhaust gas recirculation cooler, and wherein the control unit is further configured to increase a fan speed of the radiator to decrease a temperature of cooling fluid which flows through the exhaust gas recirculation cooler to initiate regeneration of the exhaust gas recirculation cooler.

21. The system of claim 18, further comprising a flow control element which controls cooling fluid flow to the exhaust gas recirculation cooler, and wherein the control unit is further configured to close the flow control element to reduce a flow of cooling fluid to the exhaust gas recirculation cooler to initiate regeneration of the exhaust gas recirculation cooler.

* * * * *